United States Patent Office 3,335,394
Patented Aug. 8, 1967

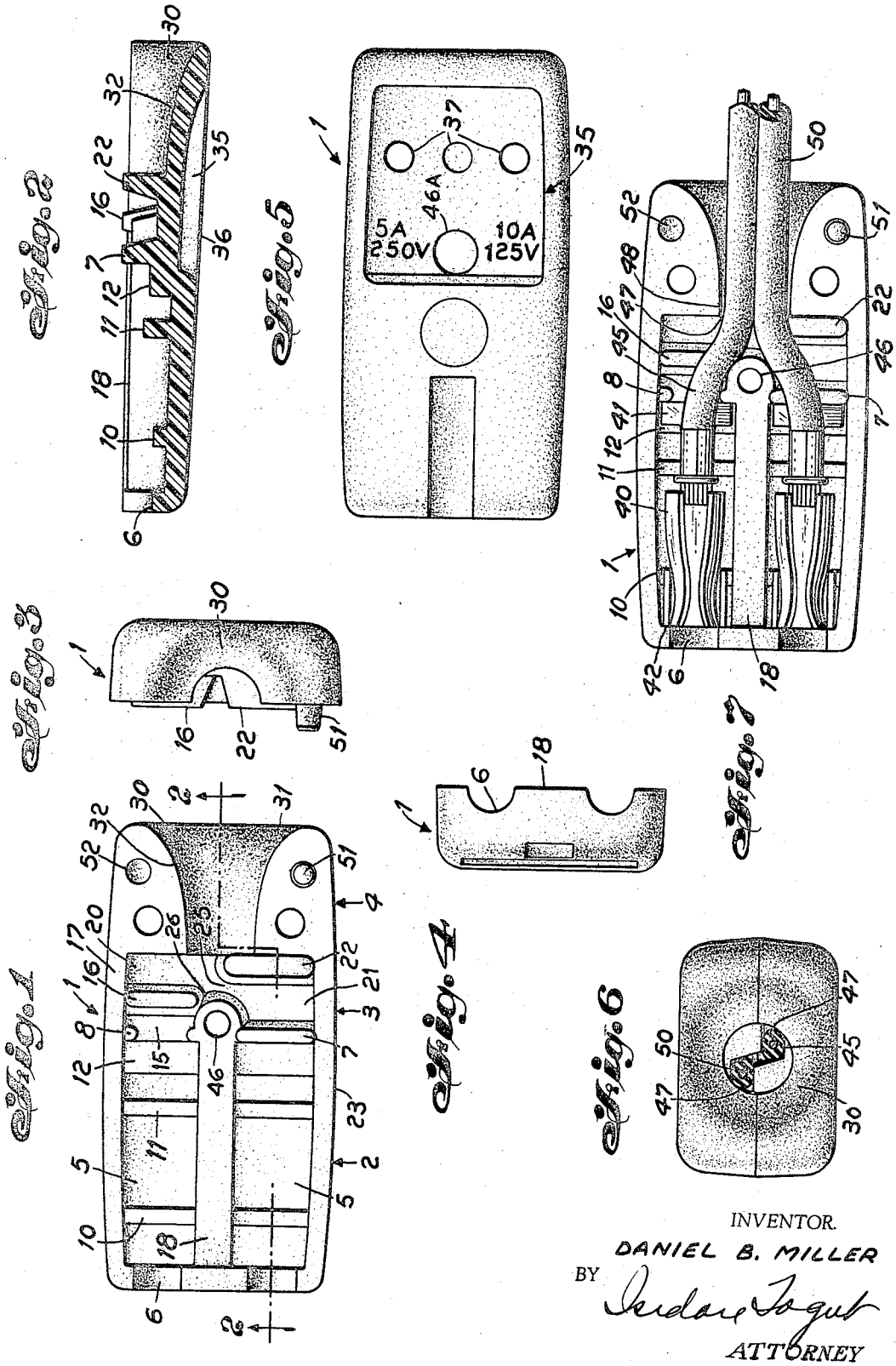

3,335,394
APPLIANCE CONNECTOR
Daniel B. Miller, Providence, R.I., assignor to International Telephone and Telegraph Corporation, Nutley, N.J., a corporation of Maryland
Filed Mar. 8, 1965, Ser. No. 437,926
4 Claims. (Cl. 339—107)

ABSTRACT OF THE DISCLOSURE

The body of an electrical connector has two identical halves each with recesses at one end for contact receptacles. Lead wires connected thereto pass through the body and out a tapered opening at the other end. Intermediate partitions extended normally from the sides of the body to the center secure the wires and provide strain relief.

This invention relates to electrical connectors and more particularly to a novel female appliance connector formed of identical molded parts.

In the manufacture of appliance connectors for appliances such as electric irons, electric coffee percolators and the like which use heating elements that provide elevated temperatures, it has been the practice to provide appliance connectors for plugging into these appliances that utilize among other things a coil spring at the end of the connectors for providing the radius of bend required by the Underwriters Laboratories. Such design naturally entails additional parts, such as the coiled spring, which is fairly expensive, and assembly procedure for additionally including the coil spring in the connector and about the electric cord.

It is an object of this invention to provide an appliance connector that eliminates the coiled spring and includes in the connector body the necessary element for providing the required radius of bend of the connector lead or cable which present stringent regulations required.

It is another object of this invention to incorporate in the same connector body a novel strain-relief arrangement.

A feature of this invention is that the connector comprises a body of dielectric material, each body consisting of two identical half parts coupled together to form a unit. Each half part includes recesses for contact blades at one end thereof, a tapered recess at the other end which has a semiconical convex-shaped surface for the entry into the connector body of lead wires connected to the contact blades and strain-relief means intermediate the contact blade recesses and the tapered recess. The lead wires are securely held by the strain-relief means and are permitted flexure within the tapered recess which has a large radius of curvature.

These and other features and objects of this invention will become more apparent by reference to the following description taken in conjunction with the accompanying drawings, in which:

FIGURE 1 is a plan view of one half the connector body;

FIGURE 2 is a section view of the connector body taken along line 2—2;

FIGURE 3 is one end view of the connector body of FIGURE 1;

FIGURE 4 is an opposite end view of the connector body;

FIGURE 5 is a plan view of the outside surface of the connector body opposite the side shown in FIGURE 1;

FIGURE 6 is the end view of the assembled connector with the electric cord; and

FIGURE 7 is a plan view of one half the connector showing the arrangement of the connector leads and contact blades therein.

With reference to the figures, there is shown an identical half part 1 of the connector body. The identical half part essentially comprises three sections. The first section 2 is the area where the contact blades are disposed in recesses provided therefor. In the section 3 there is provided a strain relief means for the connector leads and the end section 4 provides the means for affording the necessary radius of curvature of the connector wire or cord to minimize the breaking thereof. The connector blades for the appliance connector which will be shown more clearly in FIGURE 7 are disposed in the recesses 5. Recesses 5 terminate in a semi-circular cavity 6 through which the male plug of the appliance to be connected enters to mate with the contact blades or receptacles of this connector. The other end of the connector blade recesses 5 and 6 is bounded essentially by a partition 7 and two small projections 8 which essentially provide a limit to the longitudinal movement of the contact blades inserted in the recesses 5. Within the recesses 5 are disclosed partitions 10 and 11 and platforms 12. These partitions and platforms support the contact receptacles when inserted in the recesses thereby permitting a uniform wall thickness and obviating the necessity for a thicker wall which would be required if the partition and platform supports were not available.

There are three recesses which are utilized for strain relief means. The first of these recesses is more appropriately an extension of the platform 12 and is denoted by the numeral 15. The recess 15 is disposed slightly lower than the platform 12. Recess 15 is bounded by partition 16 and the side wall 17 and the middle wall 18. The middle wall 18 divides the inner body in the lower contacting end into the two recesses 5 for the contact blades or prongs. A second strain relief recess is the recess 20 and a third recess for strain relief purposes is the recess 21. Recess 21 is defined by partition 7 and partition 22, the side wall 23 and a portion on the other side of the inner wall 18. However the recess 21 is not completely closed as there is a gap 25 separating recess 21 from the recess 20. It should also be noted that there is a gap 26 between the partition 16 and the end of the wall 18 and that the partitions 7, 16 and 22 extend approximately 1/64 inch above the surface of the walls 17 and 18 as shown in FIG. 2.

The end section 4 of the connector body is the portion where flexing of cable leading into the connector ordinarily occurs. In this section is a semi-conical recess 30 which begins at the recess 20 of the partition 22 and then flares outwardly in a smoothly shaped convex curve to the end surface 31. The radius of the curved surface 32 is made large so that any flexing of the connector leads will be over a relatively large area of the connector wires and thus the stress per unit area on the connector wires will be well within the safety limits established by the Underwriters Laboratories.

Referring now to FIGURES 2 and 5 there is shown at 35 a rectangular depression 35 in the outer surface of the connector body 1. The depression 35 is parallel with the outer surface 36 as is more clearly shown in FIGURE 2 and tapers outwardly to merge with the outer surface 36 to substantially follow the contour of the convexly curved surface 32 of the semi-conical recess 30. There is achieved thereby a substantially uniform wall thickness. The recess 35 is utilized for gripping the connector between two fingers for insertion or removal of the connector in the appliance. To further secure a substantial grip on the connector shallow circular depressions 37 are disposed within the recess 35.

With reference to FIGURE 7 there is shown one half of the connector with the contact receptacles and connecting leads attached thereto disposed therein. The contact receptacle 40 is disposed within the cavity 5 and rests on the partitions 10 and 11 and platform 12 with the flat end portion 41 of the contact receptacle 40 supported on the platform 12. As stated above the longitudinal movement of the contact receptacle within the recesses 5 are limited by the end wall 42 and the projections 8 and the partition 7. The connector lead 45 is then led from the connector contact receptacle 40 in a curved path passing adjacent to the rivet hole 46 over partition 16 and within the space 47 defined by the partition 22 and the narrow end 48 of the semi-conical recess 30 and then out through the semi-conical recess 30. The other lead 50 of the connector leads is fed adjacent to the hole 46 and above the connector lead 45 to pass within the corresponding space 47 of the top body part which is not shown. An end view of the completed connector body after the two parted bodies are riveted together by means of a rivet 46A shown in FIG. 5, passing through holes 46 in both halves of the connector is shown in FIGURE 6 with one lead 45 being disposed below the second connector lead 50, both occupying spaces 47 in respective halves of the connector body. To insure that the two identical connector body parts line up and mate properly there is provided in each body part a cylindrical member 51 projecting from the body adjacent to the semi-conical recess 30 which cylindrical member will fit into a corresponding hole 52 on the mating body part. When the two body parts are placed together face to face and then aligned by means of the two cylindrical members 51, they are then riveted together by a rivet passed through the holes 46 in both connector body parts. Although deformation of the insulation of the connector leads occur when the two body parts are riveted together, it is to be noted that there is a cold flow of the connector lead insulation into the strain relief recesses 20 and 21 and gap 26. As can be seen from the drawing the partitions 7, 16 and 22 are disposed in the matching position with the other body part opposite the recesses 15, 21 and 20 respectively so that when the contact receptacles with the connecting leads are placed in position and the matching body parts are riveted together the respective connector leads are respectively pushed within the recesses and effectively turn the corners of the partitions so that no bending or deformation of the conductor strands within the connector leads occurs. The connector leads thus secured within the strain relief section 3 are effectively contained or prevented from flexing within the area defined by the partitions 7, 16 and 21 because of the protrusion of the partition above the wall surfaces 17 and 18, and consequently forcing the protruding parts into the connecting leads insulation. Any bending or flexing of the connector leads which occurs within the end portion 4 of the body will be over a large radius as determined by the curvature 32 of the semi-conical recess 30. The novel design of this appliance connector eliminates the surplus of parts heretofore required with all of the functions now being contained in two identical connector body parts.

While I have described above the principles of my invention in connection with specific apparatus, it is to be clearly understood that this description is made only by way of example and not as a limitation to the scope of my invention as set forth in the objects therefore and in the accompanying claims.

I claim:
1. A female appliance connector comprising:
a body of dielectric material, said body having identical half parts, each half part having side walls and including recesses for contact receptacles at one end of said half part, each said recess including a plurality of spaced apart platforms for supporting each said contact receptacle and means disposed at each end of said receptacles to restrain excessive longitudinal movement thereof,
a tapered recess at the other end of said half part for the entry of lead wires connected to said contact receptacles disposed in said connector body,
strain relief means for said lead wires disposed intermediate said tapered recess and said recesses for said contact receptacles, said strain relief means including first, second and third recesses, said first and second recesses being separated by a first normally disposed partition extending from a side wall toward a center line of said body and said third recess being bounded on two opposing sides by second and third normally disposed partitions extending from the opposite side wall toward said center line, said first, second and third partitions being raised above the surface defining the mating surface of each said half part, and
means to couple together said half parts in the area of said strain relief means.

2. A connector according to claim 1 wherein the base surfaces of said first, second and third recesses are coplanar.

3. A connector according to claim 2 wherein said tapered recess comprises a semi-conical convex shaped surface tapering out toward the end of said connector from said strain relief means.

4. A female appliance connector comprising:
a body of thermosetting plastic material, said body comprising:
identical half parts, each half part including opposite sides,
a pair of recesses for contact receptacles at one end of said body part, said recesses being separated by a wall extending longitudinally in said body part,
a plurality of partitions in each said receptacle recess disposed normal to said wall,
a hole at the inner end of said wall,
first, second and third recesses disposed about said hole with said first and second recess being on one side of said hole and said third recess being on the opposite side thereof,
a first partition dividing said first and second recesses, second and third partitions defininig said third recess on two sides thereof, all said partitions being normal to said wall and extending toward said wall from said opposite sides,
a semi-conical recess having a convex shaped surface of large radius at the opposite end of said body part with the wide end of said semi-conical recess being at the end of said body part, said second partition protruding partially into the narrow end of said semi-conical recess,
a cylindrical cavity disposed adjacent one side of said semi-conical recess,
a cylindrical member adapted to fit into the cylindrical cavity of the mating half part disposed on the opposite side of said semi-conical recess,
means to fasten together said body parts with said contact receptacles and said lead wires therein whereby said lead wires are clamped between said three partitions and said three recesses adjacent thereto to form strain relief means for said lead wires between said contact receptacle recesses and said conical recess.

References Cited
UNITED STATES PATENTS

| 1,784,020 | 12/1930 | McKinley | 339—191 X |
| 1,866,235 | 7/1932 | Thiel | 174—89 |
| 2,525,449 | 10/1950 | Coutant | 339—107 X |
| 2,540,575 | 2/1951 | Finzil | 339—105 X |

FOREIGN PATENTS 1,166,319  3/1964  Germany.

MARVIN A. CHAMPION, *Primary Examiner.*
ALFRED S. TRASK, *Examiner.*